(12) United States Patent
Perlatti

(10) Patent No.: US 6,997,483 B2
(45) Date of Patent: Feb. 14, 2006

(54) TRANSITION SAFETY NET

(75) Inventor: Deano Perlatti, Bainbridge Island, WA (US)

(73) Assignee: Seattle Tarp Company, Seattle, WA (US)

( * ) Notice: Subject to any disclaimer, the term of this patent is extended or adjusted under 35 U.S.C. 154(b) by 0 days.

(21) Appl. No.: 10/449,997

(22) Filed: May 30, 2003

(65) Prior Publication Data

US 2004/0239107 A1   Dec. 2, 2004

(51) Int. Cl.
*F16L 35/00* (2006.01)

(52) U.S. Cl. ............................. 285/117; 285/45; 403/11

(58) Field of Classification Search .................. 285/45, 285/117, 13; 403/11; 138/106, 107, 118.1
See application file for complete search history.

(56) References Cited

U.S. PATENT DOCUMENTS

| | | | | |
|---|---|---|---|---|
| 3,053,564 A | * | 9/1962 | Evans et al. ................... 49/167 |
| 3,222,777 A | * | 12/1965 | Rutter et al. .............. 29/525.03 |
| 3,833,267 A | * | 9/1974 | McCumber .................. 406/193 |
| 4,168,726 A | * | 9/1979 | Klennert .................... 138/96 R |
| 4,207,918 A | * | 6/1980 | Burns et al. ................. 137/375 |
| 4,840,201 A | * | 6/1989 | Botsolas ...................... 138/178 |
| 4,899,965 A | * | 2/1990 | Usui ........................... 248/68.1 |
| 4,930,543 A | * | 6/1990 | Zuiches ...................... 138/110 |
| 5,195,784 A | * | 3/1993 | Richter ......................... 285/61 |
| 5,205,592 A | * | 4/1993 | Ziu .............................. 285/45 |
| 5,988,224 A | * | 11/1999 | D'Auria ...................... 138/99 |
| 6,156,140 A | * | 12/2000 | Ayres ........................... 156/66 |
| 2002/0195817 A1 | * | 12/2002 | Choi ............................ 285/45 |

* cited by examiner

*Primary Examiner*—James M. Hewitt
(74) *Attorney, Agent, or Firm*—Robert R. Richardson, P.S.

(57) ABSTRACT

A containment device provides containment for a pipe and includes a containment body having a first end section and a second end section. The containment body has an open interior that defines a channel configured to receive the pipe therein. First and second closures are configured to close an entrance of the first end section and an exit of the second end section, respectively, about the pipe. The containment body may be configured to receive therein a pipe leading from a cement pump truck. The first end section is suitably configured to receive therein a cement pump outlet pipe. The second end section is suitably configured to receive therein a cement delivery tube. A middle section interposed between the first end section and the second end section is suitably configured to receive therein a transition section of pipe between the cement pump outlet pipe and the cement delivery tube.

40 Claims, 2 Drawing Sheets

TRANSITION SAFETY NET

FIELD OF THE INVENTION

The present invention relates generally to containment and, more specifically, to containment of high-pressure effluent.

BACKGROUND OF THE INVENTION

In many applications, fluids or colloidal suspensions or the like are transported under high pressure through pipes. Depending on the application, the pipe may present a tortuous flow path. Often times, a section of piping that presents a tortuous path is made of several short lengths of pipe that are connected by couplings. The couplings may introduce angles of up to ninety degrees or more.

An example of such an application is a cement pump truck. In a cement pump truck, a cement pump pressurizes cement to around 1200 pounds per square inch ("psi"). Cement is pumped at this high pressure out an outlet of the cement pump at the rear of the cement pump truck. Typically, the cement flows through a steel pipe leading from the cement pump outlet, goes through a first coupling with a ninety degree bend, flows through a "transition area" steel pipe, goes through a second coupling with a ninety degree bend, and then flows into a cement delivery tube from which the cement is brought to its desired destination for application.

Over time, the flow of the high pressure cement through the tortuous path between the cement pump outlet and the cement delivery tube may wear down walls of the steel pipe or the couplings. As a result, the steel pipe could experience a breach of integrity or possibly catastrophic failure, or the coupling could separate from the steel pipe. In any event, a situation could exist where cement at around 1200 psi is sprayed from the cement pump. This can present a potentially dangerous situation to an operator or other personnel in the vicinity of the cement pump truck.

It is known to non-destructively evaluate pipes to determine if any cracks have formed in the pipe walls. To this end, non-destructive evaluation ("NDE") may be performed on the pipe between the cement pump outlet and the cement delivery tube. Suitable examples of NDE include use of x-ray, radiography, and fluoroscope. However, NDE presents several drawbacks. For example, NDE is expensive and takes the cement truck out of revenue service during NDE testing. Further, it is difficult to determine where the NDE should be performed. Finally, NDE cannot be performed on the couplings. As a result, NDE may not adequately predict an impending breach of integrity in the pipe or couplings between the cement pump outlet and the cement delivery tube.

Because of difficulty predicting impending breach of integrity in the pipe or couplings between the cement pump outlet and the cement delivery tube, in the event of a breach of integrity it would be desirable to protect operators and other personnel in the vicinity by containing any high-pressure cement issuing forth from such a break in the pipe or couplings. However, there is an unmet need in the art for a containment device for an area between the cement pump outlet and the cement delivery tube of a cement pump truck.

SUMMARY OF THE INVENTION

The present invention provides a containment device that provides containment for a pipe. Advantageously, embodiments of the present invention are usable with a pipe in an area between a cement pump outlet and a cement delivery tube of a cement pump truck. The containment device of the present invention is lightweight, storable in a compact space, durable, easy to install, and may be used on a variety of configurations of pipe that may present a tortuous flow path.

According to one exemplary embodiment of the present invention, a containment device is provided for providing containment for a pipe. The containment device includes a containment body having a first end section and a second end section. The containment body has an open interior that defines a channel that is configured to receive the pipe therein. First and second closures are configured to close an entrance of the first end section and an exit of the second end section, respectively, about the pipe.

According to an aspect of the invention, the containment body may be configured to provide containment for a pipe leading from a cement pump truck. In such an exemplary embodiment, the first end section is suitably configured to receive therein a cement pump outlet pipe. The second end section is suitably configured to receive therein a cement delivery tube. A middle section interposed between the first end section and the second end section is suitably configured to receive therein a transition section of pipe between the cement pump outlet pipe and the cement delivery tube.

According to further aspects of the present invention, the containment body may be made of a high-strength mesh, such as polyester. Further, the closures may each include a strap, that is suitably made of webbing, and a buckle.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the present invention provides a containment device that provides containment for a pipe. Advantageously, embodiments of the present invention are usable with a pipe in an area between a cement pump outlet and a cement delivery tube of a cement pump truck. The containment device of the present invention is lightweight, storable in a compact space, durable, easy to install, and may be used on a variety of configurations of pipe that may present a tortuous flow path. A non-limiting example of an embodiment of the present invention will first be set forth, followed by details of construction of an embodiment of the present invention.

Figure 1:
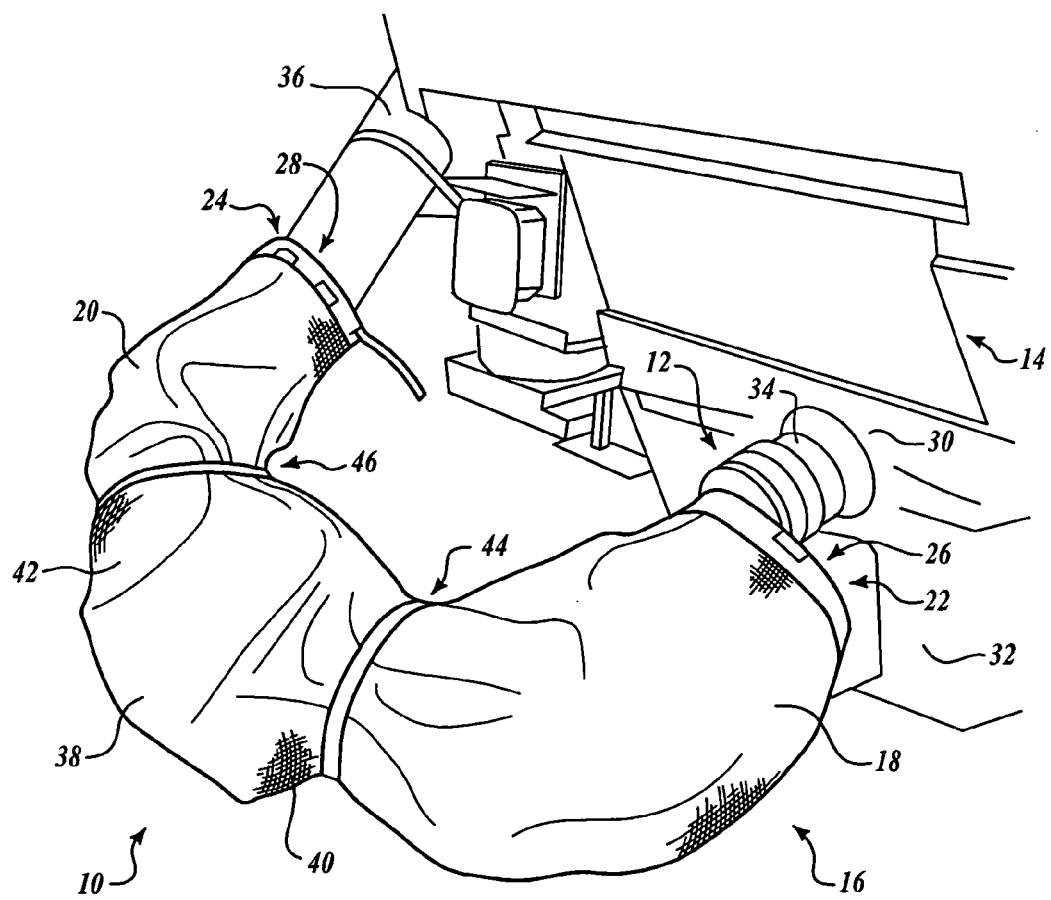
FIG. 1 is a perspective view of one embodiment of an exemplary containment device of the present invention installed on a cement pump truck.

Referring now to FIG. 1, one exemplary embodiment of the present invention provides a containment device 10 for providing containment for a pipe 12, such as the pipe 12 leading from a cement pump (not shown) of a rear section 14 of a cement pump truck. The containment device 10 includes a containment body 16 having a first end section 18 and a second end section 20. The containment body 16 has an open interior (not shown) that defines a channel (not shown) that is configured to receive the pipe 12 therein. First and second closures 22 and 24 are configured to close an entrance 26 of the first end section 18 and an exit 28 of the second end section 20, respectively, about the pipe 12.

According to this exemplary, non-limiting example, the containment device 10 is suitably configured to provide containment for the pipe 12 leading from an outlet 30 from an aft bulkhead 32 of a tank of the rear section 14 of a cement pump truck. As is known, the cement pump (not shown) raises pressure of cement (not shown) in the tank to a high pressure, such as around 1200 psi. As is also known, the pipe 12 includes an outlet pipe 34 leading from the outlet 30 of the cement pump (not shown). A first coupling (not shown) with an approximately ninety degree bend is attached to an end of the outlet pipe 34. A "transition area" pipe (not shown) is attached at a first end to the first coupling (not shown). The transition area pipe is attached at a second end to a second coupling (not shown) with an approximately ninety degree bend. A cement delivery tube 36 is attached at a first end to the second coupling (not shown). Thus, the "transition area" refers to the part of the pipe 12 between the outlet pipe 34 leading from the outlet 30 of the cement pump and the cement delivery tube 36. The cement, under high pressure, is pumped by the cement pump from the tank through the pump outlet 30 and the outlet pipe 34, the first coupling, the transition area pipe, the second coupling, and the cement delivery tube 36 to its desired destination for application.

In this exemplary embodiment, the entrance 26 of the first end section 18 is suitably configured to receive therein the outlet pipe 34. The exit 28 of the second end section 20 is suitably configured to receive therein the cement delivery tube 36. A middle section 38 of the containment device 10 is interposed between the first end section 18 and the second end section 20. The middle section 38 is suitably configured to receive therein the transition section of pipe between the outlet pipe 34 and the cement delivery tube 36. The middle section 38 has a third end 40 in the vicinity of the first coupling (not shown) and a fourth end 42 in the vicinity of the second coupling (not shown). A third closure 44 is provided at the third end 40 and a fourth closure 46 is provided at the fourth end 42.

The containment device 10 is secured to the pipe 12 as follows. The open interior of the containment device 10 is placed about the pipe 12. The containment device 10 is slid onto the pipe 12 and into place such that the pipe 12 is received in the channel defined by the open interior. The first closure 22 is closed and tightened. This closes the entrance 26 about the outlet pipe 34 and holds the first end section 18 onto the outlet pipe 34. The second closure 24 is closed and tightened. This closes the exit 28 about the cement delivery tube 36 and holds the second end section 20 onto the cement delivery tube 36. The third and fourth closures 44 and 46 are closed and tightened. This holds the middle section 38 onto the transition area pipe. In the event of a failure or other breach of integrity of walls of the pipe 12 or of the couplings, as is known cement under high pressure sprays from the location of the failure or breach of integrity. However, according to the invention, the containment device 10 is held onto the pipe 12. Advantageously, the containment body 16 contains any such sprayed cement within the containment device 10.

Figure 2:
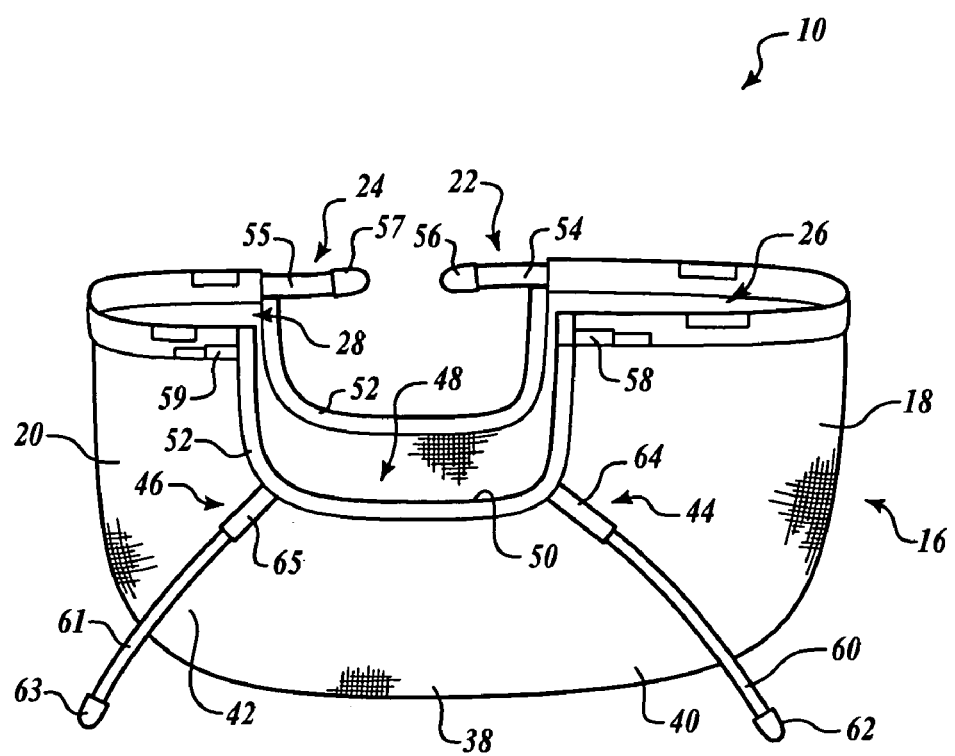
FIG. 2 is a perspective view of a containment device of the present invention.

Referring now to FIG. 2, details are now set forth regarding construction of the containment device 10. The containment body 16 is suitably made of a strong, light-weight heavy-duty material, such as fabric, that is able to contain high-pressure spray. In one presently preferred embodiment, the containment body 16 is made of a mesh, such as a polyester mesh. The mesh may be up to around 40 mil thick. However, it will be appreciated that any thickness may be used as desired for a particular application. If desired, the mesh may be coated with a coating, such as vinyl. The coating advantageously protects the mesh from normal wear and tear encountered during use and transport of the containment device 10.

The containment body 16 has an interior section 48 that defines a channel 50 that is configured to receive therein the pipe (not shown) for which containment is to be provided. If desired, an edge 52 of the open interior section 48 may be lined with a lining. The lining advantageously strengthens the containment body 16 at points where the containment body 16 is attached to the pipe (not shown), as will be discussed further below. Given by way of non-limiting example, the lining suitably includes webbing. Advantageously, webbing provides up to around 2500 psi of breaking capacity.

Given by way of non-limiting example, the illustrated embodiment shows the containment body 16 arranged in a U-shaped configuration. This permits the containment body 16 to be slid through its open interior section 48 onto an arrangement of pipes in a U-shaped configuration, such as may be found on the rear section 14 of the cement pump truck (FIG. 1), until the pipes are received within the channel 50. However, it will be appreciated that the containment body 16 suitably has any shape as desired for a particular application. For example, the containment body 16 may have a straight or substantially straight shape to provide containment for straight or substantially straight piping. Alternately, the containment body 16 may be curved or angled as determined by piping configured in a tortuous path for which containment is to be provided. In summary, the present invention is not limited by any shape. Advantageously, the containment body 16 may be made in any shape as desired for a particular application (as determined by shape of piping to be contained) and slid over the piping via the open interior section 48 until the piping is received within the channel 50—regardless of the shape of the piping.

The entrance 26 is lined with the lining that lines the open interior section 48. Therefore, the lining strengthens the containment device 10 at the entrance 26—that is, one of the locations where the containment body 16 is to be attached to the pipe to be contained (not shown). The first closure 22 includes a strap 54 and a suitable closing device, such as a buckle. The strap 54 is also suitably made of the same material used for the lining, such as high-strength webbing. The strap 54 extends from an end of the entrance 26. The buckle suitably includes a male member 56 and a female receptacle 58. The male member is suitably attached to an end of the strap 54. The female member 58 is suitably incorporated within the lining that lines the entrance 26. However, if desired, the female receptacle 58 may be attached to an end of another strap (not shown) that extends from another end of the entrance 26. Any acceptable buckle, such as a side-release buckle or cam buckle may be used as desired for a particular application. The buckle is suitably made from any high-strength material, such as plastic or metal. In one presently preferred embodiment, the buckle is made from metal for increased strength and durability.

The second closure 24 is constructed in a similar manner as the first closure 22. The second closure 24 includes a strap 55, a male member 57, and a female receptacle 59 similar to the strap 54, the male member 56, and the female receptacle 58. Also, the exit 28 is lined in a similar manner as the entrance 26. For the sake of clarity and brevity, details need not be repeated for an understanding of the invention.

The third closure 44 suitably includes a strap 60 and buckle that includes a male member 62 and a female receptacle 64 incorporated within the lining as described above for the first and second closures 22 and 24. In one presently preferred embodiment, the third closure 44 is provided at the third end 40 that is advantageously located in the vicinity of a bend in the piping (not shown) to be contained. That is, the third closure is located to provide an attachment to the piping near an area of the piping where a breach of integrity may be more likely to occur. Such a location helps the third closure 44 maintain the containment body 16 in place in case of such a breach of integrity. If desired, the strap 60 may be attached only to the lining in the vicinity of the female receptacle 64. However, if desired, the strap 60 may be attached to the containment body 16 at additional attachment points.

The fourth closure 46 is constructed in a similar manner as the third closure 44. The fourth closure 46 includes a strap 61, a male member 63, and a female receptacle 65 similar to the strap 60, the male member 62, and the female receptacle 64. For the sake of clarity and brevity, details need not be repeated for an understanding of the invention.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A cement pump truck pipe containment device comprising:
   a containment body having a first end section and a second end section, the containment body having an open interior that defines a channel that is configured to receive a pipe therein and configured to contain a leak from a pipe received therein;
   an entrance lining that lines a first edge that defines an entrance of the first end section of the containment body;
   an exit lining that lines a second edge that defines an exit of the second end section of the containment body; and
   first and second closures having receptacles that are incorporated within the entrance and exit linings respectively, the first and second closures being configured to close the entrance of the first end section and the exit of the second end section, respectively, about a pipe.

2. The containment device of claim 1, further comprising a middle section interposed between the first and second end sections, the middle section having third and fourth ends.

3. The containment device of claim 2, further comprising third and fourth closures configured to close the third and fourth ends, respectively, about a pipe.

4. The containment device of claim 1, wherein the containment body is U-shaped.

5. The containment device of claim 1, wherein the containment body is made of a high-strength mesh.

6. The containment device of claim 5, wherein the mesh is coated with polyester.

7. The containment device of claim 2, wherein the containment body is configured to receive therein outlet piping of a cement pump trunk.

8. The containment device of claim 7, wherein the entrance of the first end section is configured to receive therein an outlet pipe from a cement pump.

9. The containment device of claim 7, wherein the exit of the second end section is configured to receive therein a cement delivery tube.

10. The containment device of claim 7, wherein the middle section is configured to receive therein a transition section of pipe between an outlet pipe from a cement pump and a cement delivery tube.

11. The containment device of claim 1, wherein the first and second closures each includes a strap.

12. The containment device of claim 11, wherein the straps include webbing.

13. The containment device of claim 11, wherein the first and second closures each further includes a male member.

14. The containment device of claim 3, wherein the third and fourth closures each includes a strap.

15. The containment device of claim 14, wherein the straps include webbing.

16. The containment device of claim 14, wherein the third and fourth closures each further includes a buckle.

17. A cement pump truck pipe containment device comprising:
   a U-shaped containment body having a first end section with an entrance and a second end section with an exit and a middle section interposed between the first and second end sections and having third and fourth ends, the containment body having an open interior that defines a channel that is configured to receive a pipe therein and configured to contain a leak from a pipe received therein
   an entrance lining that lines a first edge that defines the entrance of the first end section of the containment body;
   an exit lining that lines a second edge that defines the exit of the second end section of the containment body;
   an interior section lining that lines third edges of the middle section of the containment body; and
   first and second closures having receptacles that are incorporated within the entrance and exit linings respectively, the first and second closures being configured to close the entrance of the first end section and the exit of the second end section, respectively, about a pipe.

18. The containment device of claim 17, further comprising third and fourth closures configured to close the third and fourth ends, respectively, about a pipe.

19. The containment device of claim 17, wherein the containment body is made of a high-strength mesh.

20. The containment device of claim 19, wherein the mesh is coated with polyester.

21. The containment device of claim 17, wherein the containment body is configured to receive therein outlet piping of a cement pump trunk.

22. The containment device of claim 21, wherein the entrance of the first end section is configured to receive therein an outlet pipe from a cement pump.

23. The containment device of claim 21, wherein the exit of the second end section is configured to receive therein a cement delivery tube.

24. The containment device of claim 21, wherein the middle section is configured to receive therein a transition section of pipe between an outlet pipe from a cement pump and a cement delivery tube.

25. The containment device of claim 17, wherein the first and second closures each includes a strap.

26. The containment device of claim 25, wherein the straps include webbing.

27. The containment device of claim 25, wherein the first and second closures each further includes a male member.

28. The containment device of claim 18, wherein the third and fourth closures each includes a strap.

29. The containment device of claim 28, wherein the straps include webbing.

30. The containment device of claim 28, wherein the third and fourth closures each further includes a buckle.

31. A cement pump truck pipe containment device comprising:
   a U-shaped containment body having an open interior that defines a channel that is configured to receive a pipe from a cement pump truck therein and configured to contain a leak from a cement pump truck pipe received therein, the containment body including:
      a first end section with an entrance that is configured to receive therein a cement truck outlet pipe;
      a second end section with an exit that is configured to receive therein a cement delivery tube; and
      a middle section interposed between the first and second end sections and having third and fourth ends, the middle section being configured to receive therein a transition section of pipe between a cement pump outlet pipe and a cement delivery tube;
   an entrance lining that lines a first edge that defines the entrance of the first end section of the containment body;
   an exit lining that lines a second edge that defines the exit of the second end section of the containment body;
   an interior section lining that lines third edges of the middle section of the containment body;
   a first closure having a receptacle incorporated within the entrance lining and configured to close the entrance of the first end section about a cement pump outlet pipe; and
   a second closure having a receptacle incorporated within the exit lining and configured to close the exit of the second end section about a cement delivery tube.

32. The containment device of claim 31, further comprising third and fourth closures configured to close the third and fourth ends, respectively, about a pipe.

33. The containment device of claim 31, wherein the containment body is made of a high-strength mesh.

34. The containment device of claim 33, wherein the mesh is coated with polyester.

35. The containment device of claim 31, wherein the first and second closures each includes a strap.

36. The containment device of claim 35, wherein the straps include webbing.

37. The containment device of claim 35, wherein the first and second closures each further includes a male member.

38. The containment device of claim 32, wherein the third and fourth closures each includes a strap.

39. The containment device of claim 38, wherein the straps include webbing.

40. The containment device of claim 38, wherein the third and fourth closures each further includes a buckle.

* * * * *